United States Patent
Trimberger et al.

(10) Patent No.: US 9,520,949 B2
(45) Date of Patent: Dec. 13, 2016

(54) OPTICAL COMMUNICATION CIRCUITS

(71) Applicant: Xilinx, Inc., San Jose, CA (US)

(72) Inventors: Stephen M. Trimberger, Incline Village, NV (US); Austin H. Lesea, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 97 days.

(21) Appl. No.: 14/297,535

(22) Filed: Jun. 5, 2014

(65) Prior Publication Data
US 2015/0358085 A1 Dec. 10, 2015

(51) Int. Cl.
*H04B 10/548* (2013.01)
*H04B 10/50* (2013.01)

(52) U.S. Cl.
CPC .......... *H04B 10/503* (2013.01); *H04B 10/548* (2013.01)

(58) Field of Classification Search
CPC ... H04B 10/501; H04B 10/503; H04B 10/506; H04B 10/548
USPC .................................................. 398/200–201
See application file for complete search history.

(56) References Cited

U.S. PATENT DOCUMENTS

| | | | | |
|---|---|---|---|---|
| 4,942,568 A * | 7/1990 | Khoe | ................... | H01S 5/0687 398/196 |
| 5,394,489 A * | 2/1995 | Koch | ................. | G02B 6/12004 257/E27.128 |
| 6,275,317 B1 * | 8/2001 | Doerr | ................... | H04B 10/505 398/183 |
| 6,411,418 B1 * | 6/2002 | Deri | ..................... | H04J 14/0282 398/182 |
| 6,434,294 B1 * | 8/2002 | Gallo | ................. | G02B 6/12004 372/20 |
| 6,516,017 B1 * | 2/2003 | Matsumoto | ........... | H01S 5/0265 372/20 |
| 6,583,645 B1 | 6/2003 | Bennett et al. | | |
| 6,753,239 B1 | 6/2004 | Conn | | |
| 6,816,529 B2 * | 11/2004 | Vail | ....................... | H01S 5/4025 372/38.02 |

(Continued)

FOREIGN PATENT DOCUMENTS

EP 0875776 A2 11/1998

OTHER PUBLICATIONS

Tanaka, S. et al., "Silicon Photonics Optical Transmitter Technology for Tb/s-class I/O Co-packaged with CPU", Jan. 2014, pp. 123-131, vol. 50, No. 1, Fujitsu Sci Tech J.

(Continued)

*Primary Examiner* — Leslie Pascal
(74) *Attorney, Agent, or Firm* — LeRoy D. Maunu (57) ABSTRACT

Various apparatuses, circuits, systems, and methods for optical communication are disclosed. In some implementations an optical transmitter includes an optical data port configured to engage an optical fiber. The optical transmitter also includes a plurality of lasers coupled to the optical data port and configured and arranged to transmit respective optical signals over the optical fiber via the optical data port when selected. A control circuit of the optical transmitter is configured to receive an input data signal and encode the input data signal for transmission over the optical fiber by selecting one or more of the plurality of lasers at a time. The control circuit is configured to select one or more of the plurality of lasers at a time according to one of a frequency modulation encoding algorithm or an amplitude modulation encoding algorithm.

7 Claims, 7 Drawing Sheets

(56) References Cited

U.S. PATENT DOCUMENTS

| 6,945,712 | B1 | | 9/2005 | Conn | |
|---|---|---|---|---|---|
| 2014/0140363 | A1 | * | 5/2014 | Pezeshki | H01S 5/1246 |
| | | | | | 372/50.12 |
| 2014/0233945 | A1 | * | 8/2014 | Jeong | H04J 14/0221 |
| | | | | | 398/34 |

OTHER PUBLICATIONS

Fedeli, Jean-Marc, "Lecture: Integration of silicon photonics with electronics", CEA-LETI, Helios, Silicon Photonics—PhD course prepared with FP7-224312 Helios project, Chapter 10, pp. 1-51, May 15, 2010.

Li, M.P., et al., "Transferring High-Speed Data over Long Distances with Combined FPGA and Multichannel Optical Modules", White Paper, WP 01177 1.0, Avago Technologies, Altera Corporation, pp. 1-7, AV02-3383EN, Mar. 21, 2012.

U.S. Appl. No. 14/297,527, filed Jun. 5, 2014, Lesea, Austin H. et al.

U.S. Appl. No. 14/449,052, filed Jul. 31, 2014, Trimberger, Stephen M. et al.

Zhang, Yue et al., "Within-Tier Cooling and Thermal Isolation Technologies for Heterogeneous 3D ICs", 3D Systems Integration Conference (3DIC), 2013 IEEE International, Oct. 2-4, 2013, pp. 1-6, IEEE, San Francisco, CA.

\* cited by examiner

FIG. 7

OPTICAL COMMUNICATION CIRCUITS

FIELD OF THE DISCLOSURE

The disclosure generally relates to high speed communication, and more particularly to optical communication.

BACKGROUND

Fiber optics are used in a number of applications for high speed data communication. Fiber optic communication systems transmit data as modulated light beams through an optical fiber (e.g., glass or plastic). Fiber optic communication systems are advantageous for many applications as noise is not induced in the fiber by the presence of electromagnetic signals in the environment.

SUMMARY

Various apparatuses, circuits, systems, and methods for optical communication are disclosed. In some implementations, an optical transmitter includes an optical data port configured to engage an optical fiber. The optical transmitter also includes a plurality of optical communication circuits coupled to the optical data port and configured to transmit respective optical signals over the optical fiber via the optical data port when selected. A control circuit of the optical transmitter is configured to receive an input data signal and encode the input data signal for transmission over the optical fiber by selecting one or more of the plurality of optical communication circuits at a time. The control circuit is configured to select one or more of the plurality of optical communication circuits at a time according to one of a frequency modulation encoding algorithm or an amplitude modulation encoding algorithm.

In some implementations, an optical transmitter includes a plurality of lasers configured to transmit respective optical signals via an optical data port. Each of the plurality of lasers has a respective operating temperature range. The optical transmitter also includes a control circuit configured to select one of the plurality of lasers at a time to transmit the respective optical signal via the optical data port. The control circuit selects ones of the plurality of lasers as a function of one or more operating characteristics of the optical transmitter.

In some embodiments, an optical communication device is provided. The optical communication device includes an optical data port configured to support an optical fiber in a fixed position. The optical communication device also includes a plurality of optical communication circuits. Each of the optical communication circuits is oriented to communicate optical signals at a respective position of a cross section of the optical fiber connected to the optical data port. A control circuit of the optical communication device is responsive to optical signals communicated on the optical fiber connected to the optical data port. The control circuit is configured to determine ones of the plurality of optical communication circuits that are misaligned with the optical fiber and disable the determined ones of the plurality of optical communication circuits.

In some implementations, an optical transmitter includes first and second lasers coupled to an input terminal. The first laser is configured to transmit a first optical differential signal component of a data signal received at the input terminal. The second laser is configured to transmit a second optical differential signal component that is a complement of the first optical differential signal component.

Other features will be recognized from consideration of the Detailed Description and Claims, which follow.

BRIEF DESCRIPTION OF THE DRAWINGS

Various aspects and features of the disclosed methods, circuits, and systems will become apparent upon review of the following detailed description and upon reference to the drawings in which.

DETAILED DESCRIPTION OF THE DRAWINGS

Various aspects of the present disclosure are believed to be applicable to a variety of different types of apparatuses, circuits, systems, and methods involving optical communication.

Optical communication circuits are disclosed and include a plurality of optical communication circuits for modulation and/or configuration of various parameters of a light beam produced by the lasers. For example, in some implementations, an optical transmitter includes an optical data port configured to engage an optical fiber. The optical transmitter also includes a plurality of optical communication circuits, each configured to transmit respective optical signals over the optical fiber via the optical data port when selected. The optical communication circuits may include, for example, lasers, optical modulators, or optical waveguides to transmit optical signals. A control circuit may be configured to select various ones of the optical communication circuits for transmission of light beams over the optical fiber.

In several implementations, the optical communication circuits include a plurality of lasers. In some implementations, the control circuit is configured to adjust an amplitude/intensity of a light beam output from the transmitter by selecting different numbers of the lasers for transmission of light over the optical fiber at the same time. The control circuit may be further configured to select the lasers to encode a data signal by modulating the amplitude/intensity of the combined laser beams output by the transmitter.

In some implementations, each of the lasers is configured to produce light of a respective frequency. The control circuit may select different ones of the lasers to adjust a frequency of a light beam output by the transmitter. The control circuit may be configured to select the lasers to encode a data signal by modulating a frequency of the light beam output by the transmitter.

Different ones of the lasers may operate correctly over different temperature ranges. In some implementations, the control circuit may be configured to select ones of the lasers to use for transmission based on the current temperature of the transmitter. In this manner, the control circuit can ensure that the lasers are not operated outside of their rated operating temperature range.

Figure 1:
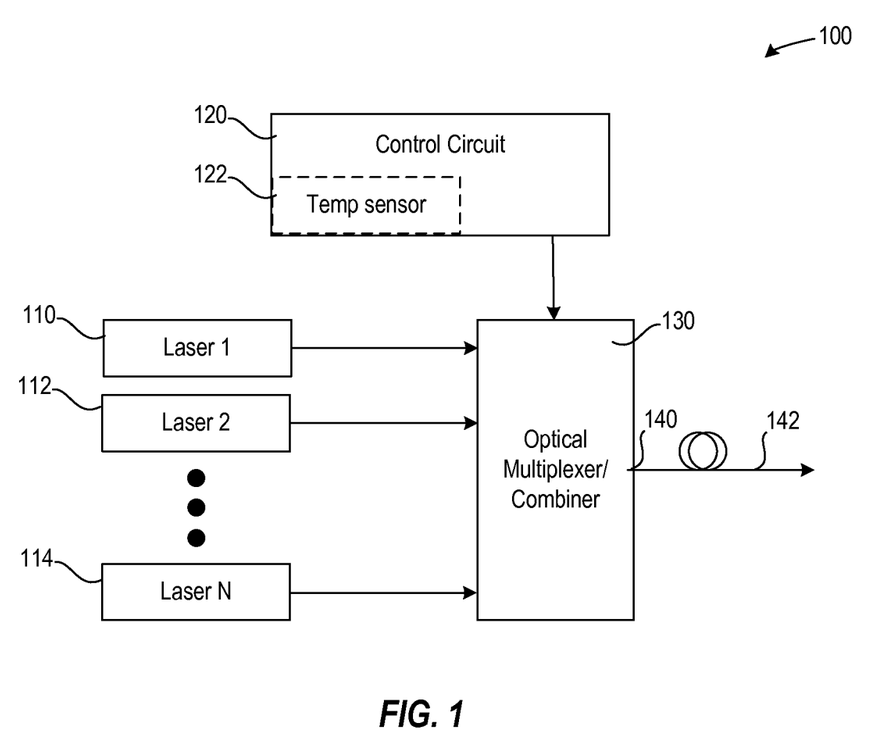
FIG. 1 shows an apparatus configured to select between a plurality of lasers for frequency modulation, amplitude modulation, and/or based on operating temperatures of the apparatus.

Turning now to the figures, FIG. 1 shows an optical transmitter having a plurality of lasers for modulation and/or configuration of various characteristics of a light beam. The optical transmitter 100 includes a plurality of lasers 110, 112, and 114. Each of the lasers 110, 112, and 114 is configured to output a respective light beam from the transmitter when selected by control circuit 120.

The optical transmitter 100 includes an optical multiplexer or an optical combiner to provide selected ones of the light beams to an optical fiber 142 connected to an optical data port 140. For example, in some implementations, the control circuit 120 is configured to enable/disable selected ones of the plurality of lasers, and the transmitter 100 includes an optical combiner configured to combine light beams produced by enabled ones of the plurality of lasers and provide the combined beam to the optical fiber 142. In some other implementations, the transmitter 100 includes an optical multiplexer configured to provide light beams selected by the control circuit 120 to the optical fiber 142. For ease of explanation, the optical transmitter is described as including an optical "multiplexer/combiner," which may be either an optical multiplexer or an optical combiner.

In some implementations, the lasers are turned on when selected and turned off when not selected. In some other implementations, all of the lasers emit light beams at the same time which are forwarded to an output or blocked by optical multiplexer/combiner 130. The optical multiplexer/combiner 130 forwards light beams from lasers selected by the control circuit 120 and may block light beams from other lasers.

Different ones of the lasers 110, 112, and 114 may have different temperature ranges at which the lasers will operate correctly. In some implementations, the control circuit 120 is configured to select ones of the lasers to use for transmission based on the current temperature of the transmitter as indicated by a temperature sensor 122. In this manner, the control circuit can ensure that the lasers are not operated outside of their rated operating temperature range and that unusable lasers are turned off and do not consume power or generate interfering signals.

In some implementations, the control circuit 120 is configured to adjust an amplitude/intensity of the single light beam provided to the optical fiber 142 by selecting different numbers of the lasers 110, 112, and 114 for transmission of light over the optical fiber at the same time. The control circuit 120 may be further configured to encode a data signal by modulating the amplitude/intensity of the single light beam provided to the optical fiber 142 to produce an amplitude modulated signal.

In some implementations, each of the lasers 110, 112, and 114 is configured to produce light of a respective frequency. The control circuit 120 may select different ones of the lasers to adjust a frequency of the single light beam provided to the optical fiber 142. The control circuit 120 may be further configured to encode a data signal by modulating a frequency of the single light beam to produce a frequency modulated signal.

The example shown in FIG. 1 may be adapted for the selection of other types of optical communication circuits, such as optical modulators or waveguides. For instance, a control circuit (e.g., 120) may be configured to select ones of a plurality of optical modulators, which output respective light beams. An optical multiplexer/combiner (e.g., 130) may be configured to forwards light beams from optical modulators that are selected by the control circuit and block light beams from other ones of the optical modulators.

Figure 2:
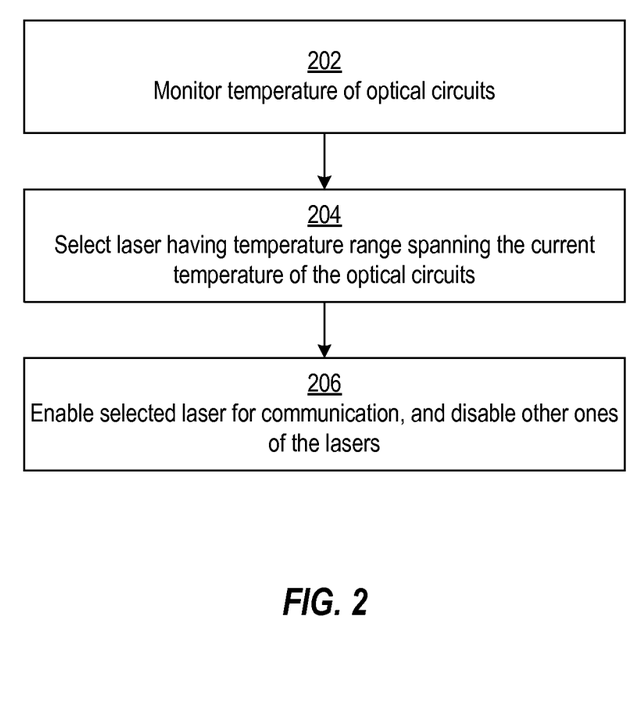
FIG. 2 shows a process for communicating using multiple lasers.

FIG. 2 shows a process for communicating with a transmitter having multiple lasers. The temperature of optical circuits of a transmitter is monitored at block 202. At block 204, a laser is selected that has an operating temperature range spanning the current temperature of the optical circuits. At block 206, the selected laser is enabled for communication and other ones of the lasers are disabled.

Circuits, apparatus, and methods are also disclosed for automated alignment of an optical fiber with communication circuits using multiple communication circuits. In some implementations, an optical communications device includes an optical data port for supporting an optical fiber in a fixed position. The optical communications device includes an array of communication circuits, each oriented to communicate optical signals at a respective position of a cross section of the optical fiber connected to the optical data port. In some implementations, the optical communications device includes a control circuit responsive to optical signals communicated on the optical fiber connected to the optical data port. The control circuit is configured to determine those of the optical communication circuits that are misaligned with the optical fiber and disable the optical communication circuits determined to be misaligned.

Figure 3A:
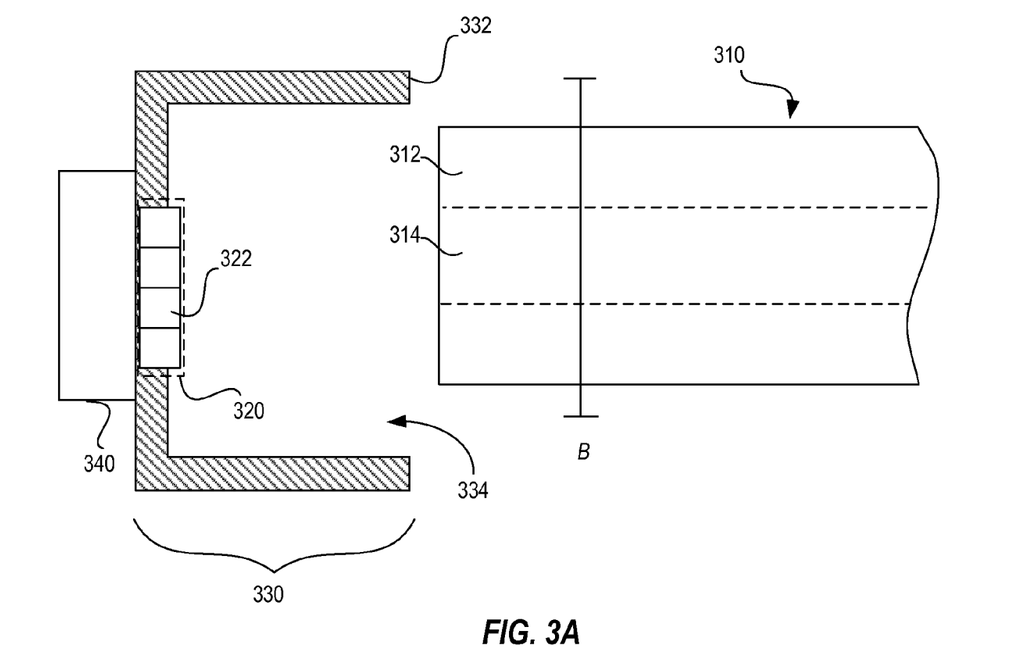
FIG. 3A illustrates an optical data port having an array of communication circuits for communication over an optical fiber.

FIG. 3A illustrates a side cross sectional view of an optical data port having a plurality of communication circuits for communication over an optical fiber. The optical data port 330 includes a structure 332 having an opening 334 shaped to receive an optical fiber 310. The optical fiber 310 includes a core 314 surrounded by an outer jacket 312. The outer jacket 312 serves to protect the core 314 and to increase reflectiveness at the surface of core, thereby reducing the loss of light during transmission.

The optical data port 330 includes communication circuits (e.g., communication circuit 322) arranged in an array of communication circuits 320 and located at the back of the opening 334. The communication circuits 320 are configured to transmit and/or receive optical data via the optical fiber. The communication circuits may include, for example, lasers, optical modulators, or optical waveguides to transmit optical signals and/or optical detectors to receive optical signals. Those of the communication circuits 320 that are aligned with the core 314 may transmit/receive optical data at a respective position of the cross section of the opening. The optical data is communicated in a direction normal to the cross section of the optical fiber 310.

Figure 3B:
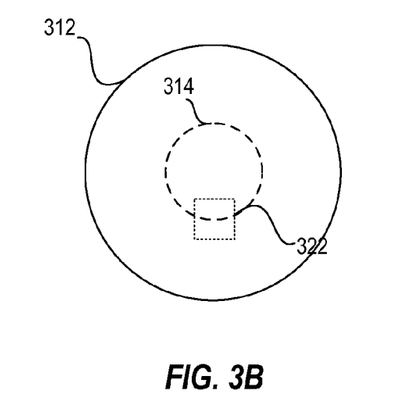
FIG. 3B illustrates alignment of an optical fiber with a single communication circuit.

In order to achieve the highest data rates and throughput in an optical communication system, the communication circuit must be aligned with the core of the optical fiber. FIG. 3B shows a cross section B of the optical fiber 310 shown in FIG. 3A relative to a position of the single communication circuit 322. As shown in this example, the single communication circuit 322 is not aligned with the core 314 of the fiber. This misalignment is problematic for optical communications.

Figure 3C:
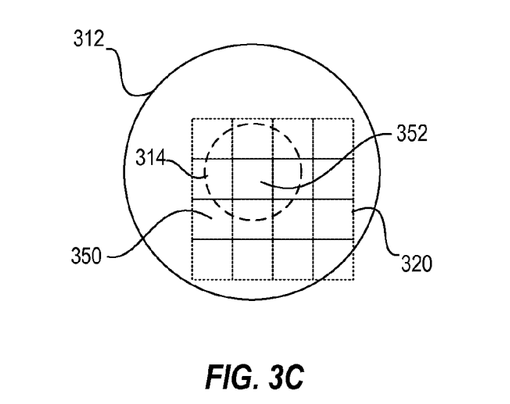
FIG. 3C illustrates alignment of an optical fiber with an array of communication circuits.

FIG. 3C shows the cross section B of the optical fiber 310 relative to the array of communication circuits 320. Each of the communication circuits 320 is oriented at a respective position of the cross section. The array of communication circuits 320 provides a larger area for alignment with the core 314 of the optical fiber in comparison to the single communication circuit 322. For instance, although the communication circuit 350 is not aligned with the core 314, communication circuit 352 is aligned with the core and may be used for communication.

Referring again to FIG. 3A, in some implementations, the optical data port includes a control circuit 340 that is configured to determine those of the communication circuits that are aligned with the core and thereafter use the determined the communication circuits for communicating optical data. In some implementations, other ones of the communication circuits that are not aligned with the core may be powered down to save power.

Figure 4:
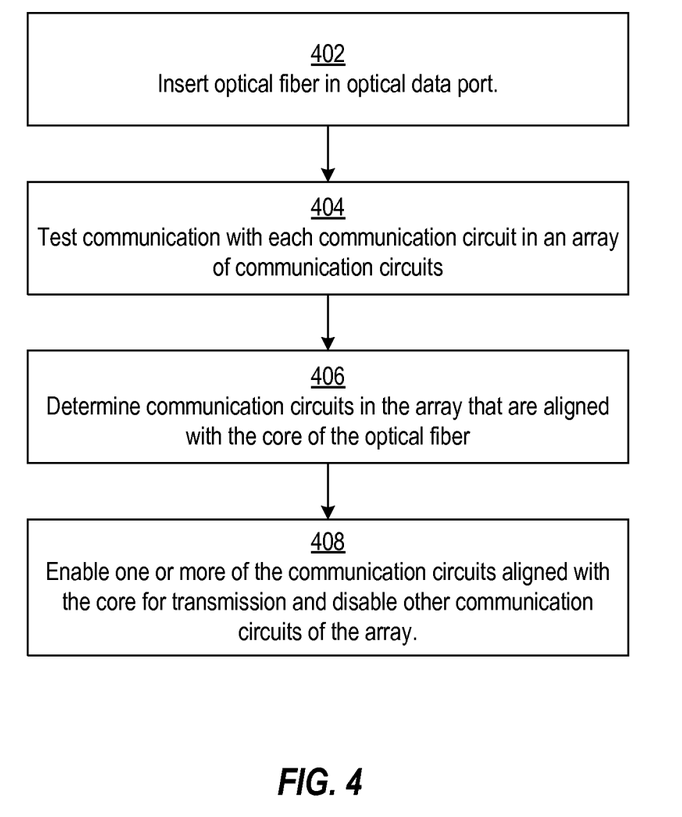
FIG. 4 shows a process for automated alignment of an optical fiber using an array of communication circuits.

FIG. 4 shows a process for alignment of an optical fiber using an array of a plurality of communication circuits (e.g., lasers). An optical fiber is inserted into an optical data port at block 402. At block 404, communication is tested with each communication circuit in the array of communication circuits. Testing may be performed using various processes. In some implementations, a first device may transmit optical data via the optical fiber to prompt a second device to provide a response. The response may be provided via the optical data line or an electronic communication network. In some implementations, the first device may send an electronic signal to the second device to prompt the second device to send optical data to the first device via the optical fiber. Other testing mechanisms may also be used. At block 406, communication circuits in the array that are aligned with the core of the optical fiber are determined. At block 408, one or more of the communication circuits aligned with the core are enabled, and the communication circuits of the array that are not aligned are disabled.

Apparatus and methods are also disclosed for orienting an optical fiber with an optical data port. In some implementations, an optical fiber is configured with a jacket having a non-circular cross section. The optical data port may also have a non-circular cross section that is congruent to the jacket. The optical data port may be configured to engage the non-circular cross-section of the jacket only when it is aligned with the non-circular cross section of the optical data port.

Figure 5:
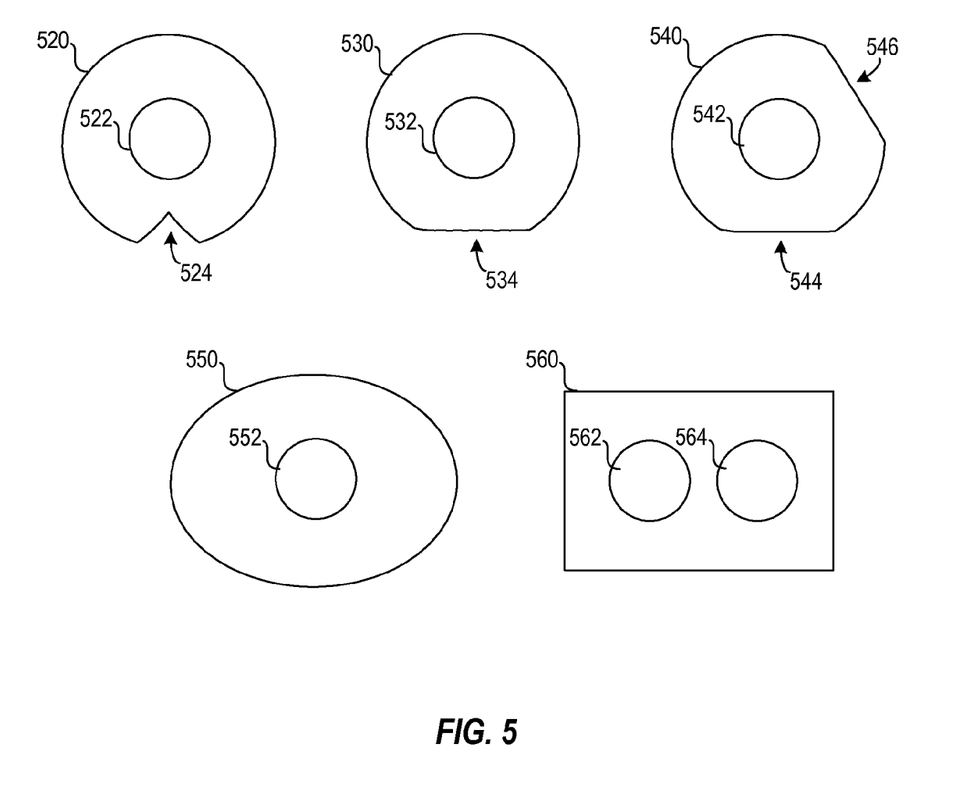
FIG. 5 shows various non-circular optical fiber ends that may be used for alignment of an optical fiber.

FIG. 5 shows various non-circular optical fiber ends that may be used for alignment of an optical fiber in accordance with one or more implementations. A first optical fiber has a core 522 surrounded by a substantially circular jacket 520. The jacket 520 has a notch 524 to give the jacket a non-circular cross section. A second optical fiber has a core 532 surrounded by a substantially circular jacket 530. The jacket 530 includes a flat surface 534, which gives the jacket a non-circular cross section. A third optical fiber has a core 542 surrounded by a substantially circular jacket 540. The jacket 540 includes two flat surfaces 544 and 546, which gives the jacket a non-circular cross section. A fourth optical fiber has a core 552 surrounded by a jacket 550 having an oval cross-section. The oval cross-section gives the jacket 550 a non-circular cross section. In some implementations, an optical fiber may include multiple cores. For instance, a fifth optical fiber has two cores 562 and 564 surrounded by jacket 560. In this example the jacket 560 has a rectangular cross section. The optical fibers may be modified to include jackets having other non-circular cross sections or having a different numbers of cores.

Apparatus, circuits, and methods are also disclosed for communication using optical differential signals. In some implementations, an optical communications system includes an optical transmitter configured to communicate using optical differential signals. The optical transmitter includes a first laser configured to transmit a first optical differential signal component of a data signal received at an input terminal. The optical transmitter also includes a second laser configured to transmit a second optical differential signal that is a complement of the first optical differential signal component.

In some implementations, an optical communications system also includes an optical receiver configured to receive the first and second optical signal components from the optical transmitter. The optical receiver is configured to retrieve the data signal based on the first and second optical signal components.

Figure 6:
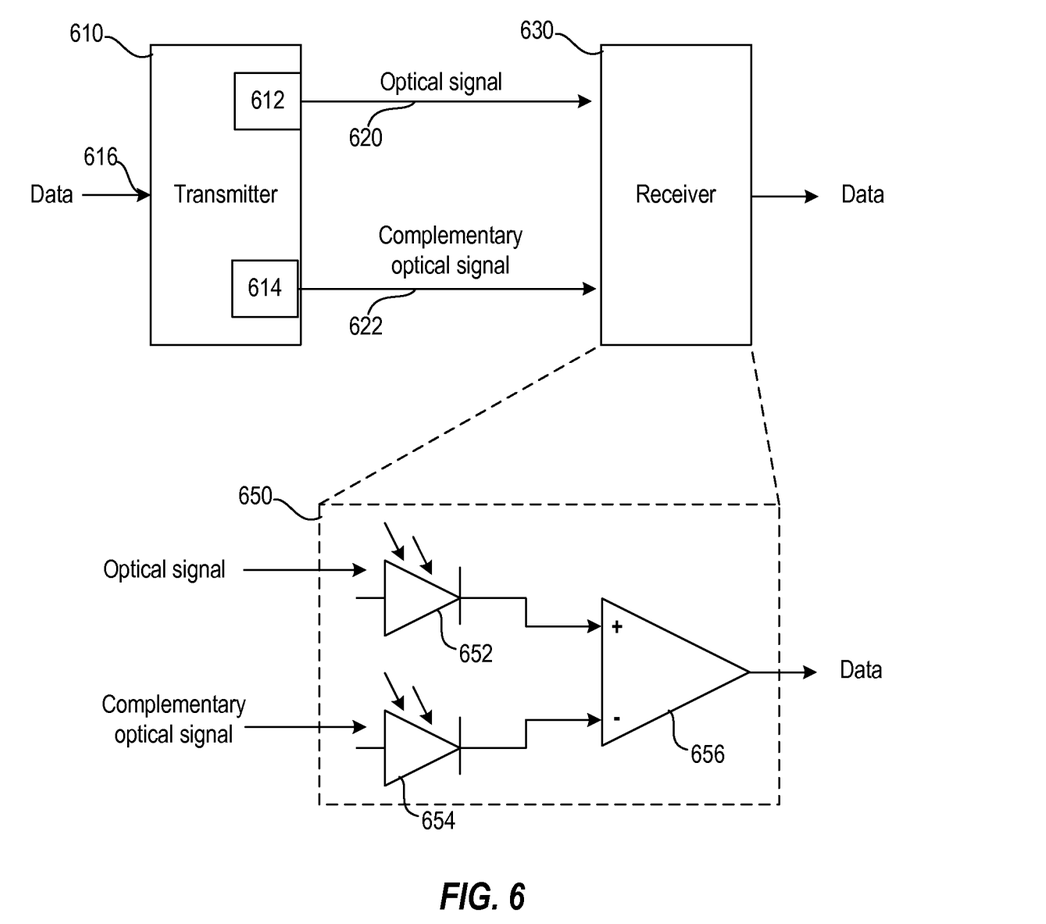
FIG. 6 shows a system for communication using optical differential signals.

Turning back to the figures, FIG. 6 shows a system for communication using optical differential signals. The optical communications system includes an optical transmitter 610 and an optical receiver 630 configured to communicate using optical differential signals. The optical transmitter 610 includes a first laser 612 configured to transmit a first optical differential signal component 620 of a data signal received at an input terminal 616. The optical transmitter 610 also includes a second laser 614 configured to transmit a second optical differential signal 622 that is a complement of the first optical differential signal component 620. The signals are complementary in that when the first optical differential signal component encodes a logical '1,' the second optical differential signal component encodes a logical '0'. Conversely, when the first optical differential signal component encodes a logical '0,' the second optical differential signal component encodes a logical '1'.

The optical receiver 630 is configured to receive the first and second optical differential signal components 620 and 622 from the optical transmitter 610. The optical receiver 630 is configured to retrieve the original data signal (received at input terminal 616) based on the first and second optical signal components.

An example implementation of the optical receiver 630 is shown by optical receiver 650. In this example, the optical receiver 650 includes a first photo-diode 652 configured to receive the first optical differential signal component and output a first voltage indicative of a light intensity of the first optical data signal component. The optical receiver 650 also includes a second photo-diode 654 configured to receive the second optical differential signal component and output a second voltage indicative of a light intensity of the second optical data signal component. The optical receiver 650 includes a demodulation circuit 656 configured to demodulate the differential signal based on the first and second voltages to retrieve the original data signal (received at input terminal 616). In this example, the demodulation circuit 656 is implemented using a comparator circuit having a first input connected to the first voltage and a second input connected to the second voltage.

In some implementations, the first and second optical signal components may be transmitted as respective light beams on respective optical fibers or on respective cores of an optical fiber. In some other implementations, the first and second optical differential signal components may be transmitted as respective light beams on the same core of a single optical fiber. For instance, the first and second optical differential signal components may be transmitted as respective light beams having different respective frequencies. As the receiver 650, the light beams may be separated (e.g., by a prism separator) and provided to respective photo-diode 652 and 654. In some other implementations, the first and second optical differential signal components may be transmitted as respective light beams having different polarizations. At the receiver 650, the first and second optical differential signal components may be separated using polarization filters and provided to the respective photo-diode 652 and 654.

Figure 7:
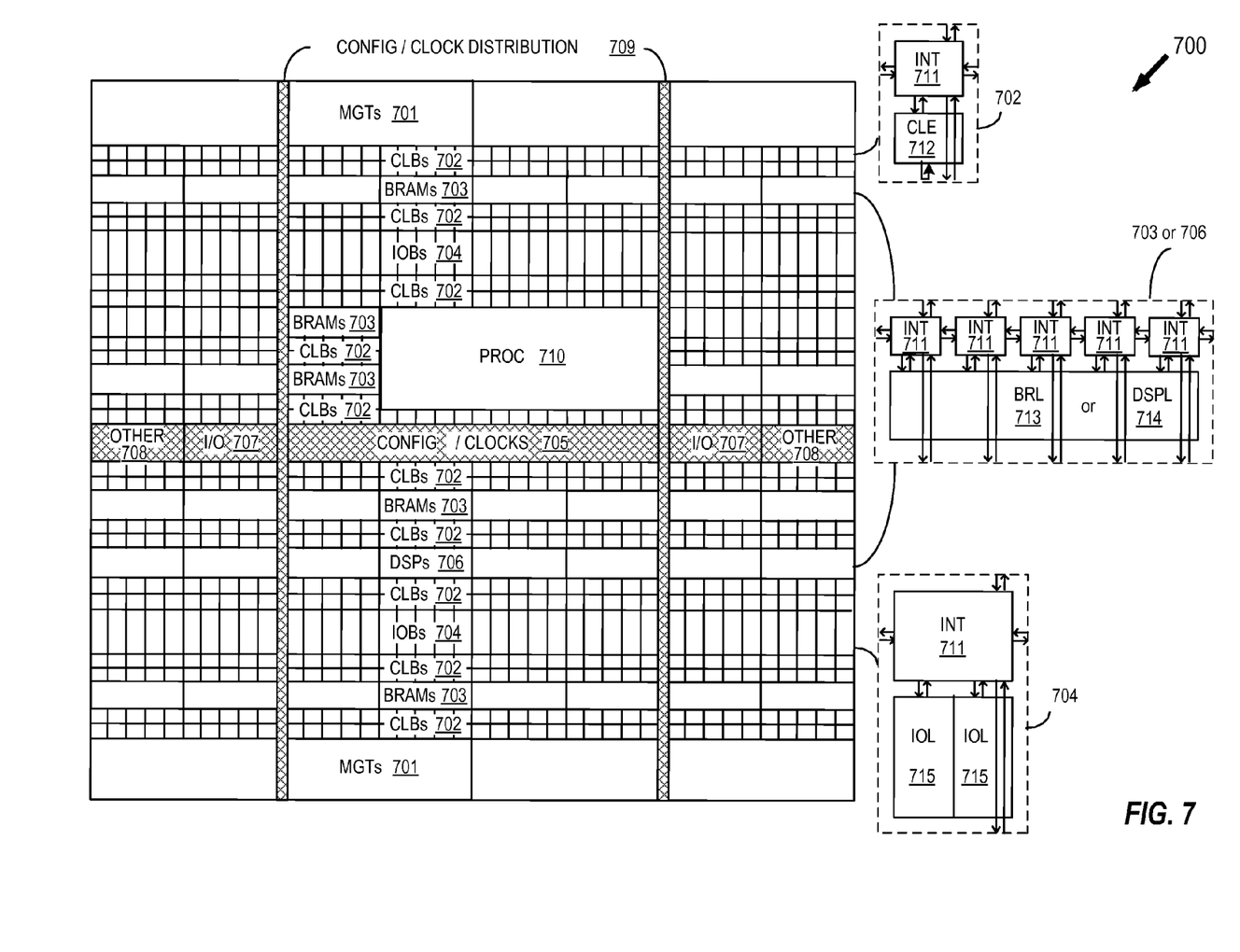
FIG. 7 shows a FPGA package that may be configured in accordance with one or more implementations.

The various implementations may be applicable to various applications using optical data communication. As one example, a programmable IC may include an input/output block configured to communicate data over an optical fiber. FIG. 7 shows an example programmable IC that may be configured for optical communication in accordance with one of more implementations. This example shows a type of programmable IC known as a Field-programmable-gate-array (FPGA). FPGAs can include several different types of programmable logic blocks in the array. For example, FIG. 7 illustrates an FPGA architecture (700) that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some FPGAs also include dedicated processor blocks (PROC) 710 and internal and external reconfiguration ports (not shown). In some implementations, at least one of the IOBs 704 is configured to communicate optical data in accordance with one or more of the above described implementations.

In some FPGAs, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA, more than one adjacent column of CLBs is typically included wherever the CLBs appear, to facilitate the efficient implementation of user logic.

The methods, circuits, and systems are thought to be applicable to a variety of systems and applications which utilize optical communication. Other aspects and features will be apparent to those skilled in the art from consideration of the specification. Though aspects and features may in some cases be described in individual figures, it will be appreciated that features from one figure can be combined with features of another figure even though the combination is not explicitly shown or explicitly described as a combination. The methods, circuits, and systems may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. An optical transmitter, comprising:
an optical data port configured to engage an optical fiber;
a plurality of optical communication circuits coupled to the optical data port and configured and arranged to transmit respective optical signals over the optical fiber via the optical data port when selected;
a combiner configured to combine light emitted by the plurality of optical communication circuits into a single light beam and provide the single light beam to the optical data port; and
a control circuit configured and arranged to receive an input data signal and encode the input data signal for transmission over the optical fiber by modulating amplitude of the single light beam by selecting different numbers of the plurality of optical communication circuits for transmission of light over the optical fiber at the same time.

2. The optical transmitter of claim 1, further comprising an optical multiplexer configured to receive a respective light beam from each of the plurality of optical communication circuits and output the light beams received from the one or more of the plurality of optical communication circuits selected by the control circuit.

3. The optical transmitter of claim 1, wherein the control circuit is further configured and arranged to enable the selected one or more of the plurality of optical communication circuits and disable other ones of the plurality of optical communication circuits.

4. The optical transmitter of claim 1, wherein:
the plurality of optical communication circuits includes a plurality of lasers;
two or more of the plurality of lasers are configured to produce light having a respective frequency; and
the control circuit is further configured and arranged to select ones of the plurality of lasers to modulate a frequency of the single light beam.

5. The optical transmitter of claim 1, wherein:
the plurality of optical communication circuits includes a plurality of lasers;
the plurality of lasers is configured to produce light of a same frequency; and
the single light beam is an amplitude modulated signal having an amplitude based on a number of the plurality of lasers that are selected by the control circuit for optical communication.

6. The optical transmitter of claim 1, wherein:
the optical data port is configured and arranged to support the optical fiber in a fixed position;
the optical fiber has a jacket with a non-circular cross section;
the optical data port has a non-circular cross section; and
the optical data port is further arranged to engage the non-circular cross section of the jacket only when it is aligned with the non-circular cross section of the optical data port.

7. The optical transmitter of claim 6, wherein the non-circular cross section of the optical fiber and the non-circular cross section of the optical data port each include at least one notch.

\* \* \* \* \*